United States Patent [19]

Freitag et al.

[11] 4,268,648

[45] May 19, 1981

[54] RESOL RESINS PREPARED USING BUTANOL AND TRI-ALKALI METAL PHOSPHATE

[75] Inventors: Dieter Freitag; Wolfgang Beer; Ferdinand Senge, all of Krefeld, Fed. Rep. of Germany

[73] Assignee: Bayer Aktiengesellschaft, Fed. Rep. of Germany

[21] Appl. No.: 159,486

[22] Filed: Jun. 16, 1980

[30] Foreign Application Priority Data

Jun. 20, 1979 [DE] Fed. Rep. of Germany ....... 2924808
Nov. 9, 1979 [DE] Fed. Rep. of Germany ....... 2945240

[51] Int. Cl.$^3$ .............................................. C08G 8/20
[52] U.S. Cl. .............................. 525/485; 260/29.1 R; 260/31.2 T; 260/31.4 EP; 260/31.4 R; 260/32.8 R; 260/33.4 R; 260/33.6 R; 525/481; 528/141; 528/142; 528/153
[58] Field of Search ................ 525/485, 481; 528/141, 528/142, 153; 260/29.1 R

[56] References Cited

U.S. PATENT DOCUMENTS

| | | | |
|---|---|---|---|
| 1,710,045 | 4/1929 | Deutsch et al. | 528/141 |
| 2,057,690 | 10/1936 | Moss | 528/153 X |
| 2,636,017 | 4/1953 | Schwartzberg | 528/141 X |
| 2,962,459 | 11/1960 | Ash et al. | 528/142 X |
| 3,298,973 | 1/1967 | Quarles et al. | 528/141 X |
| 3,644,269 | 2/1972 | Hoyt et al. | 528/153 X |
| 4,110,540 | 8/1978 | Freitag et al. | 528/153 X |
| 4,182,732 | 1/1980 | Fry | 528/153 X |

*Primary Examiner*—Howard E. Schain
*Attorney, Agent, or Firm*—Connolly and Hutz

[57] ABSTRACT

A process for the preparation of resol resins by reacting bisphenol A with 1.2 to 1.8 moles of formaldehyde in the presence of n-butanol or isobutanol and in the presence of a tri-alkali metal phosphate as a catalyst, and their use, optionally combined with epoxy resins, for the preparation of deep-drawable, sterilizable and chemically resistant lacquer films.

8 Claims, No Drawings

RESOL RESINS PREPARED USING BUTANOL AND TRI-ALKALI METAL PHOSPHATE

Phenyl/formaldehyde resins have been known for a long time. A distinction is made between acid- and alkali- condensed resins, which are termed "novolaks" and "resols" respectively. The term "novolaks" is to be understood to refer to resins without methylol groups which are prepared in an acidic medium using an excess of phenol. "Resols" are resins which have free methylol groups which are prepared in an alkaline medium using an excess of formaldehyde. They are heat-hardenable.

In the case of resol a distinction is made between the A, B and C states the resin passes from the fusible and soluble A-state (resol) into the insoluble and gummy B-state, which is, however, swellable in a solvent (resitol), and finally into the non-fusible, insoluble solid C-state (resite).

When hardened, phenol/formaldehyde resins are particularly resistant to organic solvents, dilute acids and bases and for this reason are used in large quantities, e.g. as protective coatings for metal and wood, as foamed plastics having a fine pore structure for insulation purposes, as casting resins, moulded plastics, coverings for wire, adhesives, and for impregnating fabrics. The customary phenol/formaldehyde resins are admittedly unsuitable for many purposes, because they form rather dark coloured films and are very brittle. In order to achieve an improved elasticity and thereby an improved deep-drawability for post-cured phenol resin films, mixtures of phenol resins containing at least 50% of an epoxy resin are used. This causes a deterioration in the general resistance to water vapour (sterilisation test) at 121° C., but particularly to organic agents.

Resites base on bisphenol A are lighter in colour than resites based on phenol. Resites and resite/epoxy resin mixtures of this type are not simultaneously colourless and sterilisable on metal.

An object of the present invention is to provide a process for the preparation of resol resins by reacting bisphenol A with formaldehyde in the presence of n-butanol or iso-butanol, wherein from 1.2 to 1.8 moles of formaldehyde are used per mole of bisphenol A and the reaction is carried out in the presence of a tri-alkali metal phosphate as a catalyst.

The present invention also relates to the resoles obtained in this manner and to the use thereof, optionally combined with epoxy resins, as coating agents for metals.

The term "bisphenol A" in the present context is to be understood to refer to pure bisphenol A and to so-called "bisphenol A II quality." "Bisphenol A II quality" is a mixture which contains at least 96%, by weight, of bisphenol A and at most 4%, by weight, of one or more bisphenols corresponding to one of the following formulae:

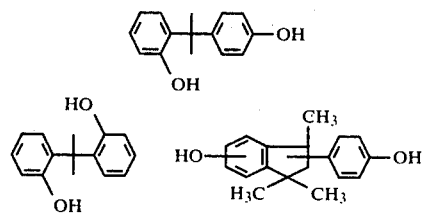

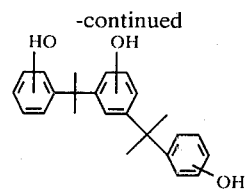

This crude product is the unpurified product from the acid-catalysed reaction of phenol with acetone.

The resole resins prepared according to the present invention are, when combined with epoxy resins or in themselves, deep-drawable, sterilisable and chemical-resistant after they have hardened.

The resoles according to the present invention may be obtained by heating 1 mole of bisphenol with from 1.2 to 1.8 moles of formaldehyde (e.g., as a 30 to 35% by wt. aqueous solution) in isobutanol or n-butanol as a solvent, for several hours. Tri-alkali metal phosphates are used as catalysts; tri-sodium phosphate and tri-potassium phosphate are particularly suitable in the pure (and) hydrated form thereof. The amount of catalyst used preferably corresponds to from 0.5 to 0.8%, by weight, of alkali metal ions, per mole of bisphenol. The reaction is generally carried out at from 80° to 110° C., preferably from 90° to 100° C. The reaction time is generally from 3 to 8 hrs, preferably from 5 to 6 hours. Recovery of the resol is simple. When the reaction has finished, a pH-of from 2 to 2.5 is adjusted using dilute phosphoric acid, the aqueous phase is separated off, the organic phase is then separated from the residual quantites of water by azeotropic distillation at a pH of 2 and is concentrated to the required solids content.

Hardening the resole into a resite is carried out using a solution of the resole and adding epoxy resin (such as Epikote 1007 of the Fa. Shell) in a coventional lacquer solvent, such as n-butanol, iso-butanol, benzene/-butanol, ethyl acetate, xylene, ethyl glycol acetate or methyl ethyl ketone, which is applied to a metallic surface in a thin film. The conventional auxiliaries may be added to the solution. An insoluble lacquer may be obtained by heating at from 100° to 300° C., preferably from 120° to 200° C., which lacquer has the characterisitics stated above. Hardening can also be carried out in the presence of catalytic quantities of acids, such as phosphoric acid, oxalic acid, p-toluene sulphonic acid, boric acid or lactic acid.

The present resols are also suitable for the production of blocks, plates, poles, tubes and profiled components (use as casting resins), for the preparation of foamed plastics and, under pressure and heat with or without fillers, for the preparation of moulded articles.

The present resols can also be used advantageously in the other areas of use for resol resins obtained from phenol. The resites according to the present invention are also particularly suitable for electro-insulating purposes.

I. Resol Manufacture

In the following Examples parts and percentages are by weight.

EXAMPLE 1

1596 g (7 moles) of bisphenol A and 44 g of Na$_3$.PO$_4$.12H$_2$O (0.5% by weight of Na$^\oplus$, based on bisphenol A, are dissolved in 1596 g of n-butanol at 62° C. After adding 910 g (9.1 moles) of 30% by weight aqueous formaldehyde solution (afterwards pH=9), this is heated at 91° C. for 1 hour and stirred under reflux for 5.5 hours at from 91° to 96° C. No formaldehyde is left and the pH is 7. Then, the pH is adjusted to 2 to 2.5 with 49 g of 85% by weight phosphoric acid, the mixture is left to stand for 1 hour at 90° C. and then ~318 g of the aqueous (at the bottom of the vessel) is separated off. The organic phase is then azeotropically dehydrated (476 g of water) for 6 hours at from 42°–52° C. sump temperature/112–16 torr. The organic solution is then concentrated and filtered to give ~60% solids substance by distilling off approximately 270 g of n-butanol at from 48° to 55° C./20 torr.

2988 g of resol resin, 63% by weight in n-butanol is obtained. Its viscosity (60% by weight solution) ~540 m.Pa s. There is no residual phenol and no residual formaldehyde.

EXAMPLE 2

Repeat of Example 1, however using 25.3 g of $K_3PO_4 \cdot 3H_2O$ (=0.7% by weight $K^{\oplus}$, based on bisphenol A, as the catalyst.

Yield of 3115 g of resol resin as a 60.5% solution in n-butanol.

Viscosity of a 60% solution ~570 m.Pa s.
No residual phenol and formaldehyde.

EXAMPLE 3

Repeat of Example 1, however using 1050 g (10.5 moles) of formaldehyde.

Yield of 3240 g of resol resin as a 60% solution in n-butanol.

Viscosity 553 m.Pa s.
No residual phenol and formaldehyde.

EXAMPLE 4

Repeat of Example 1, however using bisphenol A II. quality.

The viscosity of the 60.7 to 61.3% n-butanolic resol resin solution is 758 m.Pa s.

EXAMPLE 5

Repeat of Example, however using isobutanol as the solvent.

The viscosity of the 58.8–59.0% isobutanolic resol resin solution is 1562 m.Pa s.

Comparison Example

Repeat of Example, however using 0.5% by weight of $Na^{\oplus}$ in the form of an aqueous sodium hydroxide solution as the catalyst (pH 9 before the start of the reaction).

II. The hardening of the resol/epoxy resin mixture (from 60% solutions in butanol) into resites and their properties Stoving conditions:

10 min. at 200° C. with the addition of 0.6% of phosphoric acid, based on solids, and 0.2% of a silicone resin, based on the total lacquer.

The ratio of resol resin to epoxy resin (Epikote 1007, made by Shell) was such that the lacquer film remains hard after 100 double strokes under 1 kp load with a cotton plug steeped with methyl/ethyl/ketone.

EXAMPLE 6

Example 1 is repeated, but instead of 910 g, 1260 g of the 30% aqueous formaldehyde solution are added.

Yield is 3279 g of resol resin, 61% solution in n-butanol, free of phenol and formaldehyde.

The physical properties correspond to those of Example 2.

| Example | 1 | 2 | 3 | 4 | 5 | Comparison Example |
|---|---|---|---|---|---|---|
| Weight Ratio Resole resin: epoxy resin (Epikote 1007, made by Shell): | 40:60 | 40:60 | 35:65 | 35:65 | 35:65 | 40:60 |
| Amount applied g/m² | 5.9 | 6.4 | 6.9 | 6.3 | 6.6 | 6.6 |
| Methyl/Ethyl/Ketone-wiping test, Pressure 1 kp | 100 = hard | 100 × hard | 100 × hard | 100 × hard | 100 × hard | 100 × hard |
| Deep-drawing (*)-25 mm Radii of the test specimen: | | | | | | |
| 10 mm | 3–4 | 3–4 | 3–4 | 3–4 | 3–4 | 5 |
| 15 mm | 1–2 | 2–3 | 3 | 1 | 0–1 | 5 |
| 20 mm | 0 | 0 | 0 | 0 | 0 | 1–2 |
| 25 mm | 0 | 0 | 0 | 0 | 0 | 0 |
| Sterilisation tests (*) Radii of the test specimen: | | | | | | |
| 10 mm | 4 | 4 | 4 | 4 | 3–4 | 5 |
| 15 mm | 3 | 3 | 3–4 | 1 | 1–2 | 5 |
| 20 mm | 0 | 0 | 0 | 0 | 0 | 3 |
| 25 mm | 0 | 0 | 0 | 0 | 0 | 2 |

(*) Determination according to DIN 53 230. Scale of 5 steps.
0 = best value
5 = worst value

We claim:

1. A process for preparing a resol resin which comprises reacting formaldehyde and bisphenol A in a molar ratio of from 1.2:1 to 1.8:1 in the presence of n-butanol or iso-butanol and a catalytic amount of a tri-alkali metal phosphate.

2. A process of claim 1 wherein the temperature is from 80° to 100° C.

3. A process of claim 1 wherein the temperature is from 90° to 100° C.

4. A process of claim 1 wherein the reaction time is from 3 to 8 hours.

5. A process of claim 1 wherein the reaction time is from 5 to 6 hours.

6. A process of claim 1 wherein the tri-alkyl metal phosphate is tri-sodium phosphate or tri-potassium phosphate.

7. A lacquer comprising a resol resin produced by the process of claim 1 and a lacquer solvent.

8. The lacquer of claim 7 including therein an epoxy resin.

* * * * *